US011975806B2

(12) United States Patent
Skauen

(10) Patent No.: US 11,975,806 B2
(45) Date of Patent: May 7, 2024

(54) BOAT STABILIZATION SYSTEM

(71) Applicant: SLEIPNER MOTOR AS, Fredrikstad (NO)

(72) Inventor: Ronny Skauen, Fredrikstad (NO)

(73) Assignee: SLEIPNER MOTOR AS, Fredrikstad (NO)

( * ) Notice: Subject to any disclaimer, the term of this patent is extended or adjusted under 35 U.S.C. 154(b) by 588 days.

(21) Appl. No.: 17/258,036

(22) PCT Filed: Jun. 20, 2019

(86) PCT No.: PCT/NO2019/050129
§ 371 (c)(1),
(2) Date: Jan. 5, 2021

(87) PCT Pub. No.: WO2020/009585
PCT Pub. Date: Jan. 9, 2020

(65) Prior Publication Data
US 2021/0171165 A1 Jun. 10, 2021

(30) Foreign Application Priority Data
Jul. 6, 2018 (GB) ...................... 1811126

(51) Int. Cl.
*B63B 39/06* (2006.01)
*B63B 39/04* (2006.01)
*G01C 19/30* (2006.01)

(52) U.S. Cl.
CPC ............. *B63B 39/06* (2013.01); *B63B 39/04* (2013.01); *B63B 2039/067* (2013.01); *B63B 2209/00* (2013.01); *G01C 19/30* (2013.01)

(58) Field of Classification Search
CPC ... B63B 39/06; B63B 39/04; B63B 2039/067; B63B 2209/00; G01C 19/30; B63J 3/04
See application file for complete search history.

(56) References Cited

U.S. PATENT DOCUMENTS 2,892,435 A   6/1959   Ljungström
4,972,792 A   11/1990  Yokoyama et al.
(Continued)

FOREIGN PATENT DOCUMENTS

GB          2485861 A      5/2012
KR   10-2016-0042600 A    4/2016
(Continued)

OTHER PUBLICATIONS

International Search Report (PCT/ISA/210) issued in PCT/NO2019/050129, dated Sep. 9, 2019.
(Continued)

*Primary Examiner* — Anthony D Wiest
(74) *Attorney, Agent, or Firm* — Birch, Stewart, Kolasch & Birch, LLP

(57) ABSTRACT

A boat stabilizer system includes a first gyro stabilizer configured to be arranged inside a hull, a first fin stabilizer including a fin configured to be arranged outside the hull and move relative the hull, and a power transmission interconnecting the first gyro stabilizer and the first fin stabilizer. The power transmission is arranged to transfer energy derived from precession torque of the first gyro stabilizer to the first fin stabilizer to actuate the fin.

14 Claims, 5 Drawing Sheets

(56) References Cited

U.S. PATENT DOCUMENTS

| | | | | |
|---|---|---|---|---|
| 5,909,859 | A | * | 6/1999 | Janicki ................. A63H 27/082 244/153 R |
| 8,899,166 | B2 | * | 12/2014 | Steinmann ........... G05D 1/0875 114/122 |
| 2005/0274210 | A1 | | 12/2005 | Adams et al. |

FOREIGN PATENT DOCUMENTS

| WO | WO 2014/065672 A1 | 5/2014 |
|---|---|---|
| WO | WO 2018/044173 A1 | 3/2018 |

OTHER PUBLICATIONS

Written Opinion of the International Searching Authority (PCT/ISA/237) issued in PCT/NO2019/050129, dated Sep. 9, 2019.

* cited by examiner

BOAT STABILIZATION SYSTEM

TECHNICAL FIELD

The present invention relates to a boat stabilization system, comprising interworking gyro and fin stabilizers.

BACKGROUND

The art of reducing the unpleasant and at times dangerous roll motion of boats and ships in waves have evolved over many years, and there are many principle technologies used with varying benefits and results for different conditions, type of watercraft and not least cost of implementation and operation. Such different systems include fin stabilizers, gyro stabilizers and bilge tanks to mention the most common ones.

The traditional stabilization systems used in passenger vessels, naval vessels etc., were generally designed for use in underway situations and mostly for boats cruising in displacement mode and thereby in relatively low velocities. The watercraft that have traditionally been using stabilizers have also by their size and hull shapes generally had long roll times, thereby requiring relatively slow acting stabilization system, where counter forces are applied to the waves forces over relatively long time periods.

Gyroscopic roll stabilizers for boats have been known for a long time, e.g. from US patent application 2005274210. The stabilizer includes a flywheel, a flywheel drive motor configured to spin the flywheel about a spin axis, a gimbal structure configured to permit flywheel precession about a gimbal axis, and a device for applying a torque to the flywheel about the gimbal axis. The flywheel and gimbal structure are configured so that when installed in the boat the stabilizer damps roll motion of the boat.

When the gyro stabilizer is arranged in the vessel or boat, it is oriented with the flywheel spin axis, the gimbal axis and the vessel roll axis, i.e. the longitudinal direction of the vessel orthogonal. As the boat rolls, a precession-inducing torque is applied to the gyroscope cage or housing, such that the resulting gyroscopic reaction moment will tend to right the boat.

Two different configurations are possible to counteract roll motion. In the first configuration the flywheel spin axis is vertical and the frame gimbal's axis athwartships. When the boat is rolling, the precession will be converted into a rotation about the yaw axis, while in the second configuration the precession will be converted into a rotation about the pitch axis. During precession, i.e. when the gyro is precessing to counteract roll, the flywheel angle will vary with respect to the hull, resulting in precession components in both yaw and pitch directions. However, the vessel is in general resistant to both pitch and yaw rotation resulting from roll precession forces.

Over the last 15 years, the market has evolved to where there is a requirement for also providing roll stabilization when the watercraft is at anchor, i.e. not having any forward motion, as well as stabilization systems being installed in much faster boats, including planning boats. These changes create many new challenges and issues, as explained below.

The first of the generally known issues is that with the watercraft not moving forward through the water, thus being able to make use of the forces in the waterflow passing the fins by the forward motion of the vessel to create a force to counter the waves forces that rolls the watercraft, the only way a fin stabilizer can apply a counter force, is to flap/swim the fins. This means that both the peak force possible as well as the time such a force can be applied is limited. The force is a result of the size of fin and the speed the fin is moved, and as an opposite, the faster the fin is moved, the shorter a time period the force can be applied as there is a limited physical movement of the fin, and it also has to be stopped without causing too much counter force in the undesired direction at the time.

Modern, fast watercrafts have a hull shape and a weight that makes their natural roll periods a lot shorter than the traditional vessels where stabilizers have been installed, and also that their physical requirement for stabilizer force is a higher factor compared to the boat size in comparison with the traditional watercraft equipped with stabilizers. The principal mathematical way to calculate the necessary force of a stabilizing system to reduce the roll by a desired amount is mostly based on a factor called Metacentric height (GM). This is a factor decided by how stiff the watercraft is on the water, i.e. the more it follows the waves angles, the more force is required from the stabilizer system to counter this roll, and what a stabilizer system actually does, is to force the boat to not follow the waves angle.

The total force impulse is in principally determined by the fin size. However, the efficiency of fin stabilizers depends not only of the size of the fin, but also on the geometry. A stabilizer fin with improved efficiency both at anchor and in cruising due to its geometry is disclosed in WO2014065672A1.

Further, in WO2018044173A1 a fin stabilizer device wherein the fin blade has a dual motion, is disclosed. In addition to the pivoting motion about the rotational axis, a fin displacement means can also move the fin in parallel with the hull.

In general, some of the disadvantages of gyro stabilizers and fin stabilizers can be summarized as follows;

For gyro stabilizer at anchor Internal precession resistance may prevent roll reduction forces in very slow roll motion situations. Many of the existing solution are only utilizing a part of the available precession force. Further, precession motion "reduction" by braking waste energy to heat.

Gyro stabilizers cannot maintain a constant force over time in cruising, since there must be an active precession motion to cause roll reducing.

They have a very low total roll reduction force compared to fins as total roll reduction force is the same in all speeds and in all roll periods. Complimentary force directions and general resistance to roll motion can make the boat difficult to control/steer under some conditions. For any conceivable efficiency above slow cruising speeds, size and weight becomes very significant. In general a high weight that will cause speed loss and increased fuel consumption in speeds above displacement speeds.

Fin stabilizers at anchor are in general less energy efficient than gyro stabilizers. They may even have a negative effect opposite the intended direction when the fin has to brake or stop at the end of the stroke. A typical actuator driven fin "flapping" around a forward rotation point may cause some forward "swimming" motion.

Fins in cruising are able to set up anti-roll forces over a long time by producing lift or downforce. The anti-roll force is proportional to the square of the boats speed. However, they may cause direct drag in the water leading to reduced speed or increased fuel consumption at higher speeds, typically above displacement speed. Further, since fins are extending from the hull they may come in the way and hit obstructions.

SHORT SUMMARY

A goal with the present invention is to overcome the problems of prior art, and to disclose a cost efficient and versatile boat stabilizer system that can be used for both at anchor and cruising applications.

The invention solving these problems is a boat stabilizer system according to the independent claims.

The boat stabilizer system of the invention is energy efficient and provides stabilization both at anchor and when cruising.

Due to the inherent resistance in the sea experienced by the fin, breaking devices may be reduced in size or limited compared to prior art.

BRIEF DESCRIPTION OF THE DRAWINGS

In FIGS. 4a, 4b and 4c, the power source hydraulic cylinders (41) are always directly connected to the fin stabilizer actuator (43). A pivot of the precession element (24) will pivot the movable element (34).

In FIG. 4a the diameter of the cylinders of the fin stabilizer actuator (43) and the power source (41) have the same cross section. This results in a transmission ratio of 1:1 provided the ratio in the connections to the precession axis (24) and movable element (34) are similar.

In FIG. 4b, the diameter of the cylinders of the fin stabilizer actuator (43) and the power source (41) have the same different sections. This results in a transmission ratio of different from 1:1 provided the ratio in the connections to the precession axis (24) and movable element (34) are similar.

In the following embodiments shown in FIGS. 4c to 4f the cylinders may or may not have the same cross section.

Figure 4A:
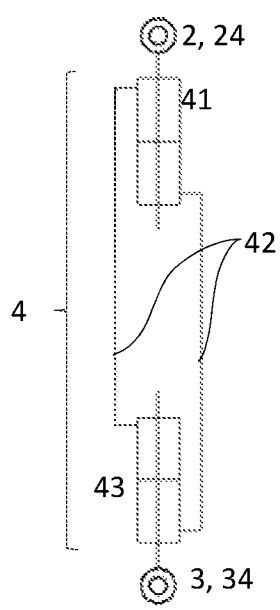
FIGS. 4a, 4b, 4c, 4d, 4e and 4f illustrates in diagrams different embodiments of the hydraulic power transmission (4) interconnecting the first gyro stabilizer (2) and the first fin stabilizer (3). The precession of the gyro stabilizer (2) resulting in pivoting about the precession element (24) is converted into hydraulic pressure in hydraulic cylinders acting as the power source (41). The hydraulic pressure is further transferred in in the drive section (42) in the form of hydraulic lines to the fin stabilizer actuator (43) in form of hydraulic cylinders connected to the movable element (34).
Figure 4B:
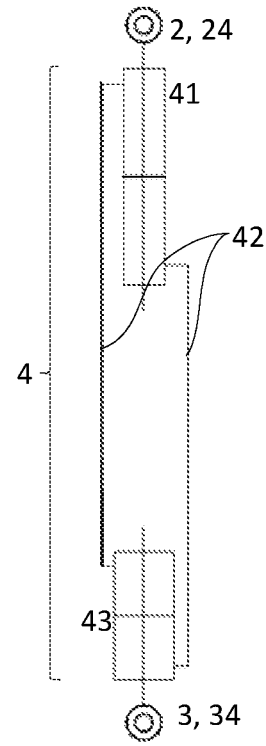
Figure 4C:
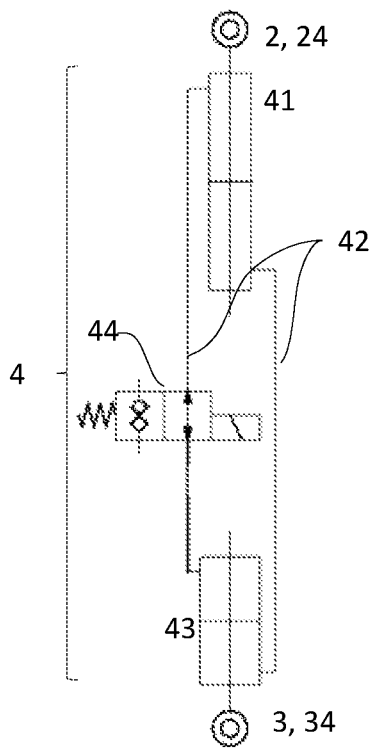

In FIG. 4c, a first lock valve (44) is arranged in the hydraulic circuit. The lock valve (44) may be a two way, two position solenoid valve with spring return as illustrated. In the normal position the double lock valve will close the circuit and the cylinders lock. In activated position the circuit is open in both directions. The rest of the circuit may be similar to the embodiment of FIG. 4a or 4b.

Figure 4D:
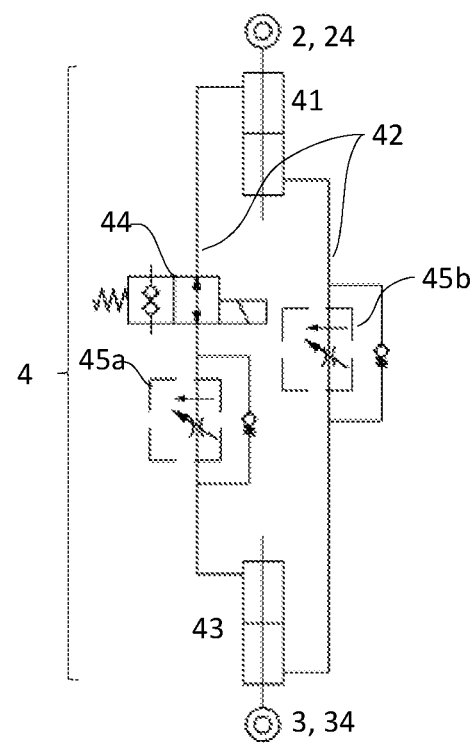

In FIG. 4d, the circuit comprises a first and second variable flow rate valve (45a, 45b) in series with each of the hydraulic lines. The variable flow rate valves (45) could be pressure compensated as indicated by the arrow. The rest of the circuit may be similar to the embodiment of FIG. 4c. It is possible to break the system by reducing flow in the flow control valves (45a, 45b).

Figure 4E:
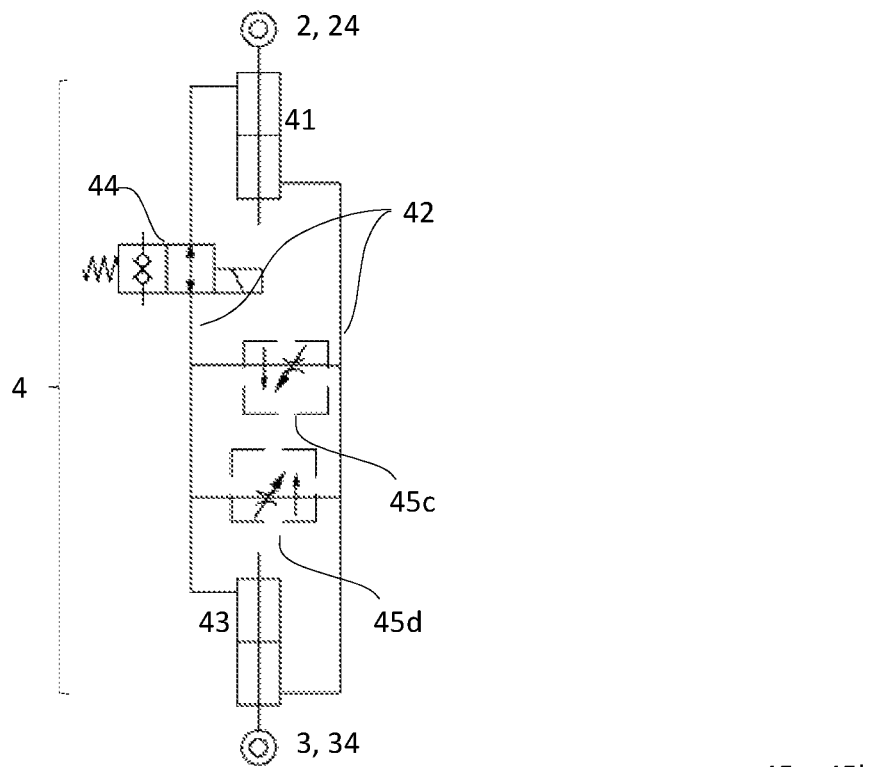

In FIG. 4e, the circuit comprises a third and fourth variable flow rate valve (45c, 45d) arranged in opposite directions in parallel with the fin stabilizer (3). The variable flow rate valves (45c, 45d) could be pressure compensated as indicated by the arrow. The rest of the hydraulic circuit is similar to the embodiment of FIG. 4c, but could also have been implemented without the first variable flow rate valve (45). This embodiment allows speed control of the fin stabilizer (3) relative to the gyro stabilizer (2).

Figure 4F:
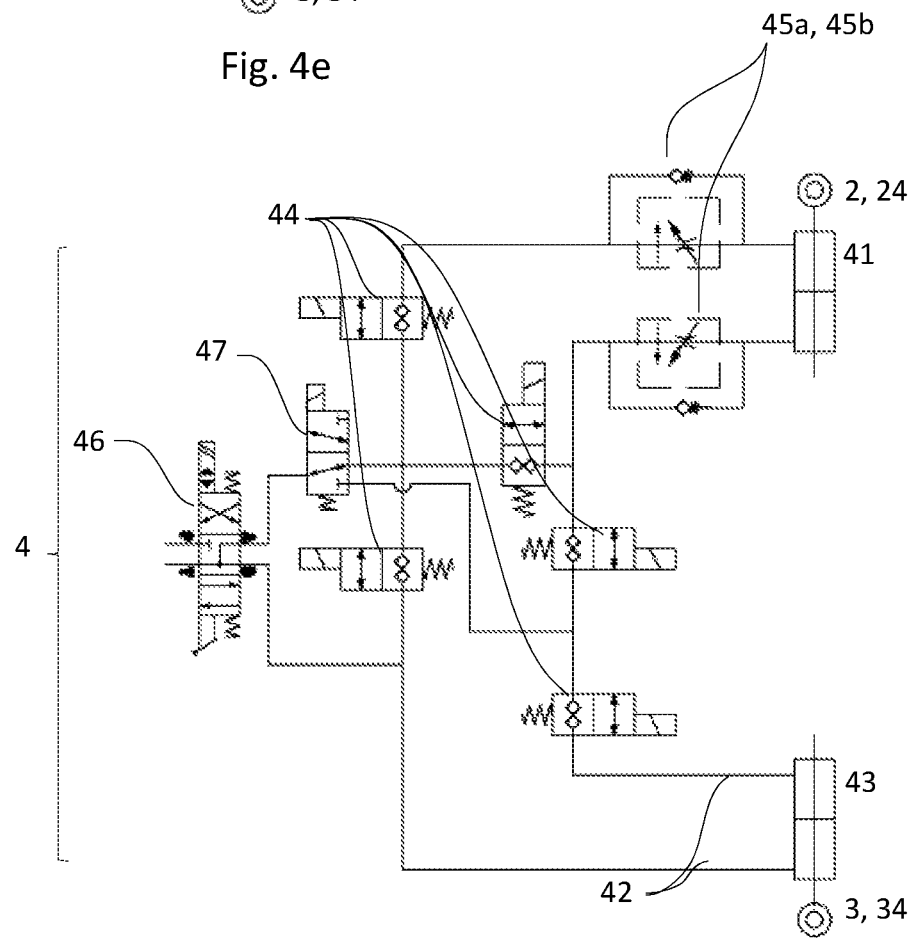

In FIG. 4f, one of the lines can further be connected to an hydraulic circuit onboard the vessel, either directly, or through a directional valve (46). The illustrated valve is a proportional four way directional valve connected to tank pressure (T) in normal position, which however may be changed by operating the valve. The three way directional valve (47) and pressure compensated flow control valves (45a, 45b) together with the lock valves (44), here normally closed, allows individual operation of gyro stabilizer and fin stabilizer (3). If needed, additional pressure may be supported from the hydraulic circuit on board the boat.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent or related embodiments defined in relation to the numbered embodiments are described. Unless otherwise specified, any embodiment that can be combined with one or more numbered embodiments may also be combined directly with any of the related embodiments of the numbered embodiment(s) referred to.

Figure 1:
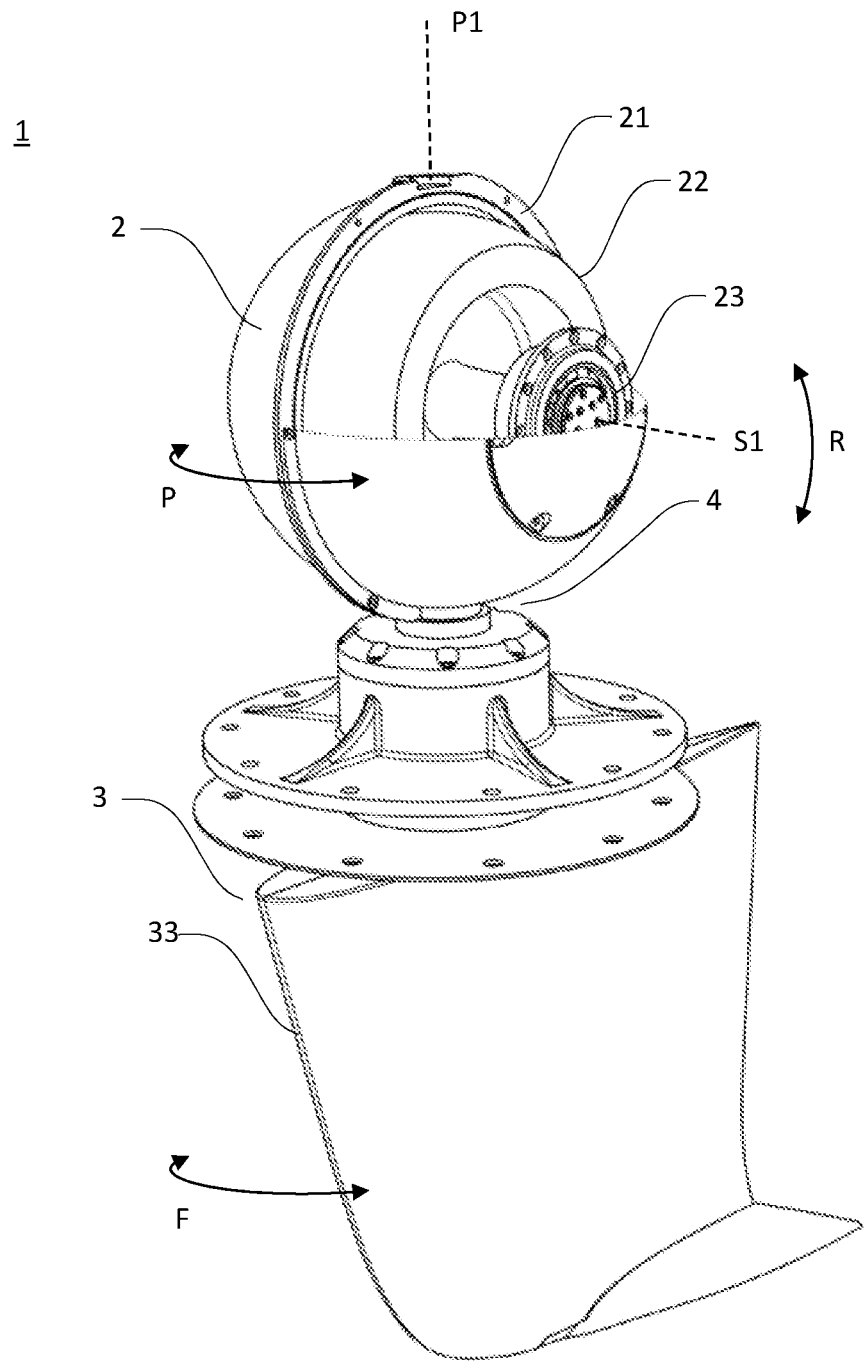
FIG. 1 illustrates in a perspective view an embodiment of the boat stabilizer system (1). A detail of the housing (21) is cut away to show the flywheel (22) and the flywheel bearing (23).
Figure 2A:
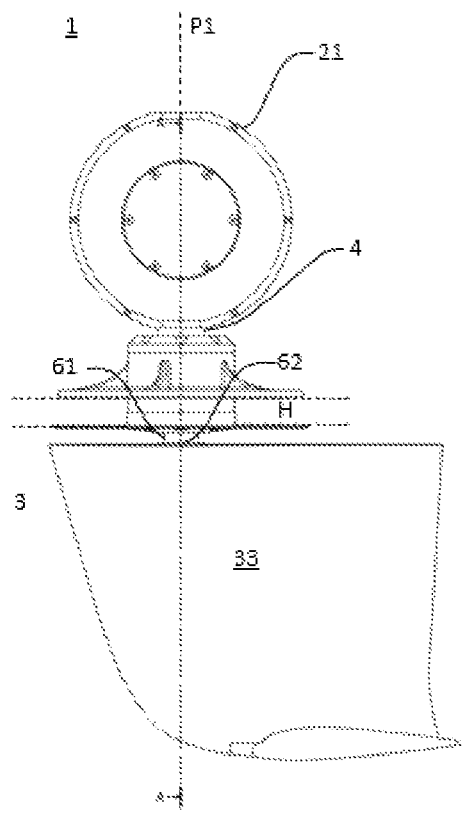
FIGS. 2a and 2b illustrates in a side view and a cross section, respectively, the same embodiment as illustrated in FIG. 1, wherein the power transmission (4) is a common shaft interconnecting the housing (21) of the gyro stabilizer (2) and the movable element (34) of the fin stabilizer (3). When the cage or housing (21) precesses about the precession axis (P1) as a result of roll, the fin (33) will pivot.
Figure 2B:
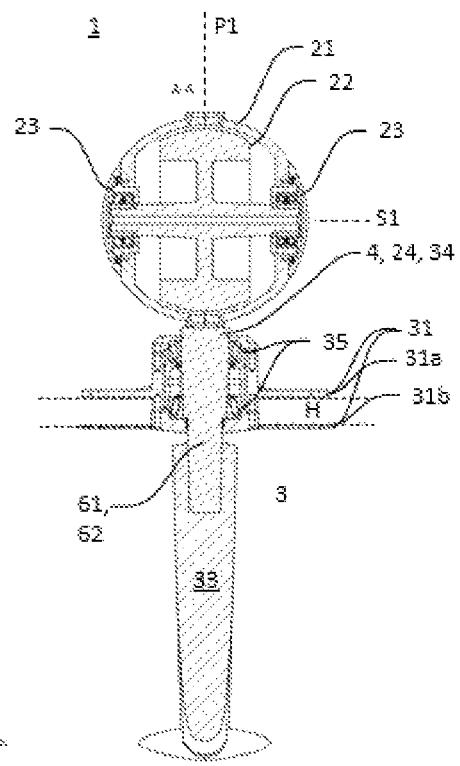

In a first embodiment wherein the features can be seen in FIGS. 1, 2a and 2b, the boat stabilizer system (1) comprises;
- a first gyro stabilizer (2) configured to be arranged inside a hull (H), and
- a first fin stabilizer (3) comprising a fin (33) configured to be arranged outside the hull (H) and move relative the hull (H).

Further, the boat stabilizer system (1) comprises a power transmission (4) interconnecting the first gyro stabilizer (2) and the first fin stabilizer (3), wherein the power transmission (4) is arranged to transfer energy derived from precession torque of the first gyro stabilizer (2) to the first fin stabilizer (3) to actuate the fin (33).

In a first related embodiment the first gyro stabilizer (2) comprises a precessing element (24) and the first fin stabilizer (3) comprises a movable element (34) connected to the fin (33). The power transmission (4) is arranged to transfer energy between the precessing element (24) and the movable element (34).

In a first related embodiment, the precessing element (24) is a precession shaft and the movable element (34) is a drive shaft connected to the fin (33). The precessing element (24) could also be other gyro elements, such as one a gimbal or the housing (21).

In a second related embodiment that may be combined with the first related embodiment, the precession element (24) and the movable element (34) are co-axial.

In a second embodiment that may be combined with the first embodiment and any of its related embodiments, the power transmission (4) has a fixed transmission ratio.

In a first related embodiment the transmission ratio is 1:1.

In a second related embodiment that may be combined with the first related embodiment, the power transmission (4) is a drive shaft connecting the precession element (24) and the movable element (34). Optionally, the precession element (24) and the movable element (34) are integrated as in a single shaft, which constitutes the drive shaft. In this case the fin stabilizer (3) is directly connected to the gyro stabilizer (2). Provided the flywheel (22) is spinning in the right direction, precession will turn the movable element (34) so that the fin (33) counteracts the roll motion of the hull (H).

To explain the dynamic behavior of the second related embodiment, rotational axis and movements have been indicated in FIG. 1. First of all the flywheel (22) is has a first spin axis (S1) which may be horizontal. The flywheel (22) is supported by bearings (23), allowing the flywheel to spin around the spin axis (S1). The spin axis (S1) should further be arranged athwartship. The precession element (24) is rotationally fixed to the housing (21) comprising the bearings (23) holding the flywheel (22).

Thus, when a roll motion (R) is converted into a force acting vertically on the flywheel axis (S1), the flywheel (22) and its housing (21) starts precessing (P) relative the hull (H). Since the precession element (24) is rotationally fixed to the housing (21) and the precession element (24) and the movable element (34) are integrated, the fin (33) will pivot (F). In this case the movable element (34) is co-axial with the fins pivot axis.

Due to the inherent resistance in the sea experienced by a rotating fin, breaking devices may be reduced in size or limited compared to prior art. Accordingly, the braking resistance of the fin may be adapted by altering the fin size and shape. This braking force may be used to secure the gyro stabilizer against over-load and too fast precession, which is a major concern with prior art stabilizers, since uncontrolled precession forces may harm the mounting means or the boat itself.

In a related embodiment the boat stabilizer system (1) comprises a rotational bearing (35) fixed relative the hull (H), supporting radial load of the shaft.

With this configuration both the fin stabilizer (3) and the gyro stabilizer (2) may be supported by only one set of one or more common bearings (35). This will in turn result in a more compact and cost effective boat stabilizer system.

However, other fin stabilizer configurations may also be used, where the drive shaft does (34) is not co-axial with the fins pivot axis.

In a third embodiment that may be combined with the first embodiment and any of its related embodiments, the power transmission (4) has a fixed transmission ratio which is different from 1:1. Thus, the movable element (34) is arranged to rotate with a different rotational speed than the precession element (24).

The transmission ratio can be fixed to a specific ratio by selecting design parameters for the power transmission (4).

In a fourth embodiment that may be combined with the first embodiment, the power transmission (4) has a variable transmission ratio.

In a fifth embodiment that may be combined with any of the embodiments above, the power transmission (4) comprises a power source (41) arranged to convert energy derived from precession torque of the first gyro stabilizer (2) into transferrable energy.

In a sixth embodiment that may be combined with any of the embodiments above, the power transmission (4) comprises a fin stabilizer actuator (43) arranged to rotate the movable element (34).

In a seventh embodiment that may be combined with the fifth and sixth embodiment, the power transmission (4) comprises drive section (42) arranged to transfer the transferrable energy from the power source (41) to the fin stabilizer actuator (42).

In a first related embodiment, the power transmission (4) is a hydraulic power transmission, where mechanical energy from the torque induced precession is converted into hydraulic energy in the power source (41) and transferred in the drive section (42) in the form of a hydraulic circuit to the fin stabilizer actuator (43), which in this case is a hydraulic actuator. Such a circuit is illustrated in FIG. 3.

Figure 3:
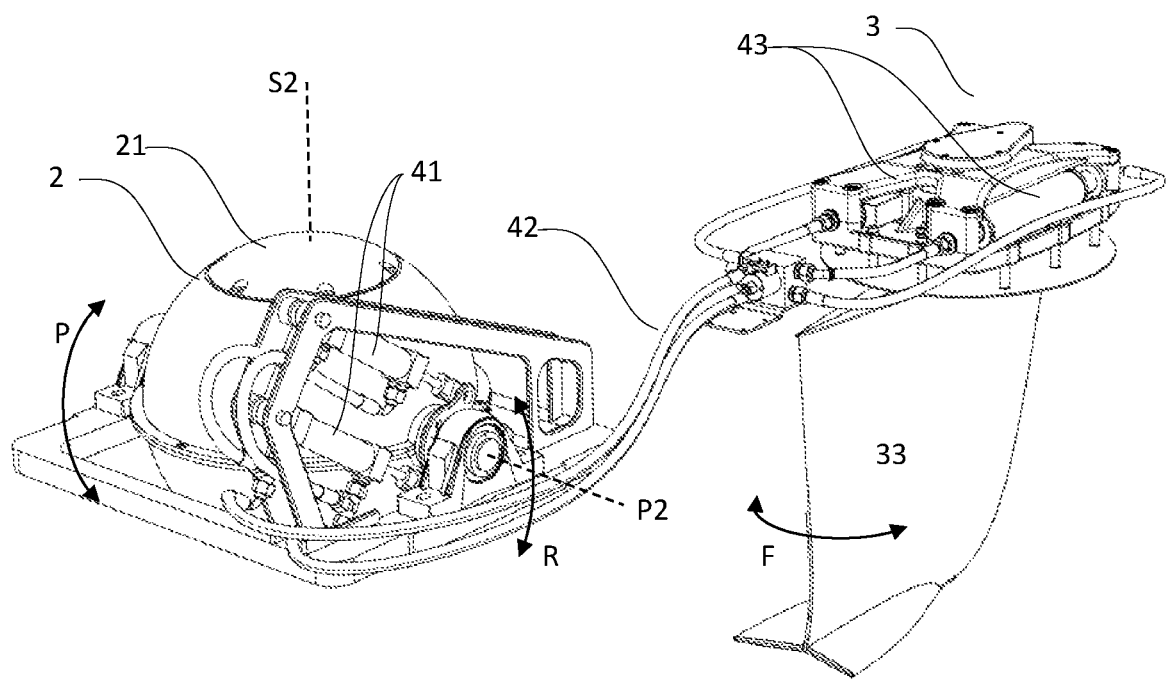
FIG. 3 illustrates in a perspective view an embodiment of the boat stabilizer system (100), where the power transmission (4) is a hydraulic power transmission. When the housing (21) precesses about the precession axis (P2) as a result of roll, a hydraulic pressure is set up in the hydraulic power transmission and the fin (33) will pivot.

The dynamic behavior of the illustrated system can be explained with the help of the indication of the rotational axis and movements in FIG. 3. First of all the flywheel (not visible) has a first spin axis (S2) which may be vertical. The flywheel is supported by upper and lower bearings (not visible) fixed to the housing (21), allowing the flywheel to spin around the spin axis (S2). The precession axis (P2) is arranged athwartship.

Thus, when a roll motion (R) is converted into a force acting vertically on the flywheel axis (S2), the flywheel and its housing (21) starts precessing (P) relative the hull (H) about the precession axis (P2). In this case the precession is converted into hydraulic pressure in hydraulic cylinders acting as the power source (41). The hydraulic pressure is further transferred in the drive section (42) in the form of hydraulic lines to the fin stabilizer actuator (43) in form of hydraulic cylinders where one end of the cylinders is fixed relative the hull, and the other connected to the movable element (34) which then will pivot when the gyro stabilizer (2) is precessing.

Any of the embodiments illustrated in FIGS. 4a, 4b, 4c, 4d, 4e and 4f and the corresponding description, may be combined with the first related embodiment above.

In a second related embodiment, the power transmission (4) is an electric power transmission, where mechanical energy from the torque induced precession is converted into electric energy in the power source (41) and transferred in the drive section (42) in the form of an electric circuit to the fin stabilizer actuator (43), which in this case is an electric actuator.

In a third related embodiment, the power transmission (4) is a mechanical power transmission, with a power source (41) with a mechanical energy output, transferred in the drive section (42) in the form of a mechanical drive to the fin stabilizer actuator (43), which in this case is a mechanical actuator. Any of gears, pulleys, shafts, rack and pinion, cardan etc. may be used in the mechanical power transmission.

Further, in other related embodiments, other types of power transmission, such as e.g. pneumatic may be used to implement the invention.

Even further, the power transmission (4) may comprise elements from any of the related embodiments above in combination, where e.g. a part of the power transmission (4) is mechanical and a another part is electric, or one part is electric and another hydraulic. This requires power conversion between the different types of energy, but may be convenient in situations where the power transmission (4) is integrated with other systems on board the boat, such as an electric Power Management System.

In an embodiment that may be combined with any of the embodiments above, the boat stabilizer system (1) comprises a control system.

In a first related embodiment that can be implemented when the power transmission ratio is variable, the control system may be arranged to control the transmission ratio. In the case of hydraulic energy transfer, the transmission means (4) may comprise a variable displacement hydraulic pump being the power source (41), and/or a variable hydraulic displacement motor being the fin stabilizer actuator (43), where the control system is configured to control displacement of the hydraulic pump and/or motor to vary the transmission ratio. Altering the transmission ratio will change the impact a roll motion has on the fin (33) displacement. It further affects the breaking force experienced by the gyro stabilizer (2). E.g. if the gear ratio is large, such as e.g. 3:1, the fin (33) will have a relatively small displacement for a roll motion compared to a small gear ratio of e.g. 1:1. Accordingly, the gyro stabilizer (2) will experience relatively more breaking force from the fin when the gear ratio is small.

Thus, the gear ratio may be varied to control how much of the precession generated force is used for gyro stabilization and for fin stabilization. This is advantageous, since gyro stabilizers and fin stabilizers behave differently at anchor and in cruising.

In a related embodiment the control system may control any of the valves (44), (45a), (45b), (45c), (45d), (46), (47) in any of the embodiments in FIGS. 4a, 4b, 4c, 4d, 4e and 4f.

In some situations, it may be possible to improve the anti-roll stabilization further. In smooth sea with small roll motions of e.g. less than 1 degree, a gyro stabilizer may not work as intended due to inertia and friction in bearings etc. Further, the gyro stabilizer may not be able to provide the necessary power to turn the fins in all situations.

In an embodiment that may be combined with any of the embodiments above, the boat stabilizer system (1) comprises an external power source arranged to provide energy to the boat stabilizer system (1). The external power source may be connected to and provide power to the power transmission (4). The external energy may be used to activate the gyro by setting up a roll dependent precession torque felt by the gyro. The gyro stabilizer (2) will then be able to stabilize the boat even as a result of smaller roll motions. Further, the external energy may be used to provide additional power to move or rotate the fin of the fin stabilizer (3) when the energy from the gyro precession is not sufficient.

FIG. 4f illustrates in a diagram a hydraulic system where additional power can be be supported from the hydraulic circuit on board the boat, where the valves indicated can be controlled from a control system, e.g. as a function of roll measurements.

Additional energy may also be supported as electric power in a corresponding electric power transmission (4), or by means of e.g. a clutch in a mechanical system.

In an embodiment that may be combined with any of the embodiments above, except where the power transmission (4) is a drive shaft directly connecting the precession element (24) and the movable element (34), the boat stabilizer system (1) comprises a clutch arranged in series with the power transmission (4).

In a first related embodiment, the clutch is arranged to transfer a variable amount of torque.

In a second related embodiment, the clutch is arranged to engage up to a pre-defined torque limit and slip above the torque limit.

According to a first fin stabilizer embodiment that can be combined with any of the embodiments above, the fin stabilizer (3) comprises a first fin connection element (61) connected to the fin (33) in a first connection point (62).

In a first related embodiment, the first fin connection element (61) could e.g. be a shaft fixed to the fin base of the fin, as illustrated in FIG. 2a. In this embodiment the first fin connection element (61) coincides and is integrated with the movable element (34) of the fin stabilizer (3).

In a second related embodiment, the fin stabilizer (3) comprises a fin blade displacement means interconnecting the movable element (34) and the fin connection element (61). In this embodiment the movable element (34) and the fin connection element (61) are not integrated, and may be co-axial or not co-axial. The fin blade displacement means may be e.g. a link arm, a gear or a transmission interconnecting the fin connection element (61) and the movable element (34), so that when the movable element (34) is pivoted as a result of precession of the gyro stabilizer (2), the rotational energy of the movable element (34) results in rotation and/or displacement of the fin connection element (61) and the fin relative the hull (H). The hull (H) is illustrated with dashed lines in FIGS. 2a and 2b.

In a third related embodiment that may be combined with the second related embodiment, the fin blade displacement means is arranged for displacing the first fin connection point (62) a first displacement (3), in parallel with a lower surface of said hull (H), and perpendicular to a hull forward direction. The fin connection point (62) is where the fin connection element (61), e.g. shaft is fixed to the fin (33) and the fin (33) will therefore move with a lateral vertical and horizontal component relative the hull (H), where the angle between the two components depend on the deadrise where the fin stabilizer (3) is arranged.

The fin blade displacement means may further be arranged for pivoting the fin base about the first connection point (62). Thus, the term "actuating the fin" used in this document may include both rotation of the fin (33) and/or displacement of the fin and the fin base relative the hull.

Further, as illustrated in FIGS. 2a and 2b, the fin stabilizer (3) comprises a hull element (31) arranged to be fixed to the hull (H). The hull element (31) may comprise an inner part (31a) and a releasable outer part (31b) as illustrated in FIG. 2b, for easy mounting of the stabilizer system (1).

The hull element (31) may comprise on or more bearings (35) supporting the fin connection element (61). In the basic fin stabilizer embodiment of FIGS. 2a and 2b, the fin connection element (61) is integrated with the movable element (34) or drive shaft.

As long as the fin or fins (33) can be used for stabilizing a boat or vessel it may take different geometrical forms. It may be e.g. a flat fin, a curved fin, a T-foil, interceptor type trim tab or a plate type trim tab.

Further, the fin or fins (33) may be arranged at various locations. This may depend on the hull type and the desired behavior. Locations could orthogonal downward with respect to deadrise of hull, lateral extending, mounted on transom etc.

Two or more fin stabilizers may be actuated from the gyro stabilizer (2). According to a second fin stabilizer embodiment that may be combined with any of the embodiments above, the power transmission (4) comprises a second fin stabilizer comprising a second fin configured to be arranged outside the hull (H) and move relative the hull (H), wherein the power transmission (4) interconnects the first gyro stabilizer (2) and the second stabilizer and wherein the power transmission (4) is arranged to transfer energy derived from precession torque of the first gyro stabilizer (2) to the second fin stabilizer to actuate the fin. The second fin stabilizer could have any of the properties of the first fin stabilizer (3), except from having its drive shaft integrated with the precession element (24) of the gyro stabilizer (2). The power transmission (4) could be e.g. mechanical, electric, hydraulic or pneumatic.

In a first gyro stabilizer embodiment that may be combined with any of the embodiments above, the components of a gyro stabilizer (2) is known from prior art, and from the descriptions above. The flywheel of the gyro stabilizer may be arranged e.g. within a normal pressure housing or inside a vacuum chamber.

Further, the flywheel spin motor may be e.g. electric or hydraulic.

Two or more gyro stabilizers may actuate the first fin stabilizer (3). In a second gyro stabilizer embodiment, that may be combined with any of the embodiments above, the power transmission (4) comprises a second gyro stabilizer comprising configured to be arranged inside the hull (H), wherein the power transmission (4) interconnects the second gyro stabilizer and the first fin stabilizer (3), and wherein the power transmission (4) is arranged to transfer energy derived from precession torque of the second gyro stabilizer (2) to the first fin stabilizer to actuate the fin. The second gyro stabilizer could have any of the properties of the first gyro stabilizer, except from having its precession element (24) integrated with the movable element (34) of the fin stabilizer (3). The power transmission (4) could be e.g. mechanical, electric, hydraulic or pneumatic.

The gyro stabilizer or stabilizers (2) may also be arranged at various locations inside the hull. However, due to weight and angular momentum it could be beneficial to arrange them symmetric about the centerline, or on the centerline if only one gyro stabilizer is used.

Further, as will be understood, from the above, two or more gyro stabilizers may actuate two or more fin stabilizers by adapting the power transmission (4) to interconnect more elements, and then connecting the stabilizers to the power transmission (4). Such power distribution can be achieved e.g. with hydraulic transfer means and proper valve arrangement.

In an embodiment that may be combined with any of the embodiments above, the boat stabilizer system comprises energy harvesting means and an energy storage arranged to harvest energy by re-generate braking energy from braking the flywheel. The energy storage could be e.g. an electric capacitor or a battery.

In a related embodiment the flywheel spin motor arranged to be powered from the energy storage.

In most implementations it is desirable to be able to limit maximum precession in order to reduce the forces between the boat and the gyro stabilizer, which in worst case could lead to material damages. The gyro stabilizer(s) and fin stabilizer(s) above will have an inherent breaking force, but may comprise dampening end stops and/or additional brakes to limit precession. Brakes could be passive or active. It may also comprise a locking system to prevent movement and actuation when enabled.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A boat stabilizer system comprising:
   a first gyro stabilizer configured to be arranged inside a hull;
   a first fin stabilizer comprising a fin configured to be arranged outside the hull and move relative the hull; and
   a power transmission interconnecting the first gyro stabilizer and the first fin stabilizer,
   wherein the power transmission is arranged to transfer actuation energy, derived from precession torque of the first gyro stabilizer, to the first fin stabilizer to actuate the fin,
   wherein the first gyro stabilizer comprises a precessing element and the first fin stabilizer comprises a movable element connected to the fin,
   wherein the power transmission is arranged to transfer energy from the precessing element to the movable element,
   wherein the precessing element is a precession shaft and the movable element is a drive shaft connected to the fin,
   wherein the precessing element and the movable element are co-axial,
   wherein the power transmission is a shaft integrating the precessing element and the movable element, and
   wherein the drive shaft and the fin extend laterally from the hull.

2. The boat stabilizer system of claim 1, wherein the power transmission has a fixed transmission ratio.

3. The boat stabilizer system of claim 2, wherein the transmission ratio is 1:1.

4. The boat stabilizer system of claim 1, comprising a rotational bearing fixable relative the hull, supporting a radial load of the shaft.

5. The boat stabilizer system of claim 1, wherein a transmission ratio is different from 1:1 and the movable element is arranged to rotate with a different rotational speed than the precessing element.

6. The boat stabilizer system of claim 1, wherein the power transmission has a variable transmission ratio.

7. The boat stabilizer system of claim 1, wherein the power transmission comprises a power source arranged to convert rotational energy derived from precession torque of the first gyro stabilizer into a transferable energy.

8. The boat stabilizer system of claim 1, wherein the power transmission comprises a fin stabilizer actuator arranged to rotate the movable element.

9. The boat stabilizer system of claim 8, wherein the power transmission comprises a drive section arranged to transfer the transferrable energy from a power source to the fin stabilizer actuator.

10. The boat stabilizer system of claim 8, wherein any of a power source, a drive section and the fin stabilizer actuator are mechanic, hydraulic, electric, or pneumatic.

11. The boat stabilizer system of claim 1, comprising an external power source arranged to provide additional energy to the boat stabilizer system.

12. The boat stabilizer system of claim 11, wherein the external power source is arranged to be connected to and provide energy to the power transmission.

13. The boat stabilizer system of claim 1, further comprising a control system.

14. The boat stabilizer system of claim 13, wherein the control system is configured to control a transmission ratio of the power transmission.

* * * * *